United States Patent
Yamamoto et al.

(10) Patent No.: US 11,089,804 B2
(45) Date of Patent: Aug. 17, 2021

(54) OIL-IN-WATER TYPE COMPOSITION AND FOOD USING SAME

(71) Applicants: SHIN-ETSU CHEMICAL CO., LTD., Tokyo (JP); SE TYLOSE GMBH & CO. KG, Wiesbaden (DE)

(72) Inventors: Atsushi Yamamoto, Niigata-ken (JP); Akira Kitamura, Niigata-ken (JP); Mitsuo Narita, Niigata-ken (JP); Heiko Nebel, Niigata-ken (JP); Anita Hirte, Niigata-ken (JP)

(73) Assignees: SHIN-ETSU CHEMICAL CO., LTD., Tokyo (JP); SE TYLOSE GMBH & CO. KG, Wiesbaden (DE)

( * ) Notice: Subject to any disclaimer, the term of this patent is extended or adjusted under 35 U.S.C. 154(b) by 487 days.

(21) Appl. No.: 15/534,417

(22) PCT Filed: Dec. 10, 2015

(86) PCT No.: PCT/JP2015/084610
§ 371 (c)(1),
(2) Date: Jun. 8, 2017

(87) PCT Pub. No.: WO2016/093296
PCT Pub. Date: Jun. 16, 2016

(65) Prior Publication Data
US 2017/0339995 A1   Nov. 30, 2017

(30) Foreign Application Priority Data
Dec. 11, 2014 (JP) ................................. 2014-250996
Nov. 24, 2015 (JP) ................................. 2015-228907

(51) Int. Cl.
A23L 29/262 (2016.01)
A23L 27/00 (2016.01)
C08L 1/28 (2006.01)
C08B 11/02 (2006.01)
A23D 7/00 (2006.01)
C08B 1/08 (2006.01)

(52) U.S. Cl.
CPC .............. *A23L 27/80* (2016.08); *A23D 7/003* (2013.01); *C08B 1/08* (2013.01); *C08B 11/02* (2013.01); *C08L 1/28* (2013.01); *A23V 2002/00* (2013.01)

(58) Field of Classification Search
CPC . A23L 27/80; C08B 11/02; C08B 1/08; C08L 1/28; A23D 7/003; A23V 2002/00
See application file for complete search history.

(56) References Cited

U.S. PATENT DOCUMENTS

| | | | |
|---|---|---|---|
| 4,410,693 A | 10/1983 | Gibson et al. | |
| 4,547,570 A | 10/1985 | Garner | |
| 6,958,393 B2 | 10/2005 | Schlesiger et al. | |
| 2004/0127700 A1 | 7/2004 | Schlesiger et al. | |
| 2005/0003071 A1 | 1/2005 | Cavallini et al. | |
| 2008/0242739 A1 | 10/2008 | Kroon et al. | |
| 2014/0134317 A1* | 5/2014 | Huebner-Keese | C08B 11/20 426/578 |
| 2014/0178556 A1* | 6/2014 | Yun | A23C 19/0765 426/582 |
| 2015/0273062 A1 | 10/2015 | Moddelmog et al. | |
| 2017/0339995 A1 | 11/2017 | Yamamoto et al. | |

FOREIGN PATENT DOCUMENTS

| | | |
|---|---|---|
| EP | 1 493 337 A2 | 1/2005 |
| EP | 1803738 A1 | 7/2007 |
| JP | 2005-21163 A | 1/2005 |
| JP | 2008-61621 A | 3/2008 |
| JP | 2009-183194 A | 8/2009 |
| WO | 00/47628 A2 | 8/2000 |
| WO | 00/59947 A1 | 10/2000 |
| WO | 2007/078015 A1 | 7/2007 |
| WO | 2012/051034 A1 | 4/2012 |
| WO | 2012/122279 A1 | 9/2012 |
| WO | 2012/173838 A1 | 12/2012 |
| WO | 2013/059064 A1 | 4/2013 |
| WO | 2014/039966 A2 | 3/2014 |
| WO | 2014/062379 A1 | 4/2014 |

OTHER PUBLICATIONS

Jan. 9, 2019 Office Action issued in Chinese Patent Application No. 201510909729.5.
Apr. 13, 2018 Extended Search Report issued in European Patent Application No. 15866629.7.
Feb. 16, 2016 Search Report issued in International patent Application No. PCT/JP2015/084610.
Apr. 25, 2016 Exteneded Search Report issued in European Patent Application No. 15199333.4.
Dec. 6, 2019 Office Action issued in U.S. Appl. No. 14/965,149.

* cited by examiner

*Primary Examiner* — Cephia D Toomer
(74) *Attorney, Agent, or Firm* — Oliff PLC

(57) ABSTRACT

An oil-in-water type composition which can provide a chewy texture both in a non-cooked state and a heated state and does not show water/oil separation, including: an alkyl cellulose, a 1% by mass aqueous solution of which has a viscosity at 20° C. of from 4,000 to 11,000 mPa·s when measured with a Brookfield type viscometer and a 1.5% by mass aqueous solution of which has a storage modulus G' (65° C.) at 65° C. of from 2,500 to 4,500 Pa; an edible oil or fat; and water. Also provided is a food using the alkyl cellulose.

5 Claims, No Drawings

OIL-IN-WATER TYPE COMPOSITION AND FOOD USING SAME

TECHNICAL FIELD

The present invention relates to an oil-in-water type composition and a food using the same.

BACKGROUND ART

Cellulose ethers having thermoreversible gelation characteristics such as methyl cellulose and hydroxypropylmethyl cellulose are used as an additive to processed foods in order to impart them with a function such as thickening properties, freezing and thawing stability, lubrication properties, moisture retention and release properties, improvement in texture, water retention properties, emulsifying properties, binding properties, or shape retention properties.

Recently, a composition for a food, comprising an oil or fat, a polymer having thermoreversible gelation characteristics and water, has been developed so that an attention has been paid to a product having an improved texture or being suppressed from releasing a meat juice containing an oil or fat component.

For example, a livestock-meat-processed food composition comprising an edible oil or fat, methyl cellulose, an emulsifier and water and requiring cooking (i.e. heating) is proposed as a pseudo meat composition of Hamburg steak (Patent Document 1). It requires an emulsifier for suppressing separation of the oil, but thermogelation of methyl cellulose during cooking prevents the oil or fat from releasing, and the gel remaining as grains imparts a juicy feel to a livestock-meat-processed food.

PRIOR ART DOCUMENT(S)

Patent Document(s)

[Patent Document 1] JP 2009-183194A

SUMMARY OF THE INVENTION

Problems to be Solved by the Invention

According to Patent Document 1, addition of an emulsifier is necessary for suppressing water/oil separation and improving the texture. However, the emulsifier itself sometimes has a bitter taste and addition of the emulsifier may impair the taste or flavor of the composition. In addition, although loss of the oil and water during cooking can be suppressed, a chewing texture cannot be obtained due to the weak gel strength of methyl cellulose.

An object of the invention is to provide an oil-in-water type composition which can provide a chewing texture both in a non-cooked state and in a cooked (i.e. heated) state and does not show oil/water separation; and a food using the composition.

Means for Solving the Problems

With a view to achieving the above-described object, the inventors have carried out an extensive investigation. As a result, they have found an oil-in-water type composition which can provide a chewing texture both in a non-cooked state and in a cooked state, as well as a food using the composition, and have completed the invention.

In one aspect of the invention, there is provided an oil-in-water type composition comprising an alkyl cellulose, a 1% by mass aqueous solution of which has a viscosity at 20° C. of from 4,000 to 11,000 mPa·s when measured with a Brookfield type viscometer, and a 1.5% by mass aqueous solution of which has a storage modulus G' (65° C.) at 65° C. of from 2,500 to 4,500 Pa; an edible oil or fat; and water. In another aspect, there is provided a food using the above-described alkyl cellulose.

Effects of the Invention

According to the invention, there is provided an oil-in-water type composition which is of a simple system, is highly viscous, can provide a chewing texture even in a non-cooked state, retains its shape even with the lapse of time, and does not cause water/oil separation even in the absence of an emulsifier. There is also provided an oil-in-water type composition which can provide a chewing texture even in a cooked state, and which is juicy and has a good texture because a loss of the water and oil is small.

EMBODIMENTS FOR CARRYING OUT THE INVENTION (1) Alkyl Cellulose

According to the invention, an alkyl cellulose having such a viscosity that a 1% by mass aqueous solution of the alkyl cellulose has a viscosity at 20° C. of from 4,000 to 11,000 mPa·s when measured with a Brookfield type viscometer and having such a storage modulus G' (65° C.) at 65° C. that a 1.5% by mass aqueous solution of the alkyl cellulose has a storage modulus G' (65° C.) at 65° C. of from 2,500 to 4,500 Pa.

This alkyl cellulose can be obtained, for example, by a method for producing an alkyl cellulose comprising the steps of: mixing a cellulose pulp with a first alkali metal hydroxide solution with stirring to obtain alkali cellulose, reacting the alkali cellulose with an alkylating agent to obtain a first reaction mixture, mixing a second alkali metal hydroxide solution with the first reaction mixture with stirring and without further blending any alkylating agent to obtain a second reaction mixture, and purifying the second reaction mixture to obtain an alkyl cellulose, wherein a ratio of the mass of a first alkali metal hydroxide in the first alkali metal hydroxide solution to the total mass of the first alkali metal hydroxide and a second alkali metal hydroxide in the second alkali metal hydroxide solution is preferably 50 to 86%.

The cellulose pulp is exemplified by a wood pulp or a linter pulp and is a material of conventional cellulose ether. An intrinsic viscosity of the cellulose pulp, which is an index of the degree of polymerization of the cellulose pulp, can be appropriately selected depending on the intended viscosity of an aqueous cellulose ether solution. The intrinsic viscosity at 25° C. is preferably from 1,000 to 2,200 ml/g, more preferably from 1,300 to 2,000 ml/g. The intrinsic viscosity of the cellulose pulp can be determined in accordance with Method A in Japanese Industrial Standard (JIS) P8215.

The cellulose pulp contains cellulose and water. In the specification, the amount of "cellulose in cellulose pulp" can be determined in accordance with Method A in JIS P8215.

The cellulose pulp is preferably a cellulose pulp powder obtained by pulverization with a pulverizer. The pulp pulverizer is not particularly limited insofar as it can make the cellulose pulp into a cellulose pulp powder. Examples of the pulverizer include a mill such as a knife mill, a cutting mill, a hammer mill, a ball mill and a vertical roller mill. The cellulose pulp powder have preferably a weight-average particle size $D_{50}$ of from 30 to 400 μm. The weight-average particle size $D_{50}$ of the cellulose pulp powder is determined by a method comprising the steps of: placing the pulp powder on the top test sieve of a plurality of test sieves which are different in opening size in accordance with JIS Z8801 and have been installed in a Low-Tap® sieve shaker; and sieving the powder by shaking or tapping to measure the mass of the powder remaining on each sieve and the mass of the powder under the sieve, wherein the mass distribution and an average particle size at 50% in the cumulative distribution are determined.

The step of mixing a cellulose pulp with a first alkali metal hydroxide solution with stirring to obtain alkali cellulose will be described.

An alkali metal hydroxide solution is blended in two stages after divided into a first alkali metal hydroxide solution and a second alkali metal hydroxide solution. The alkali metal hydroxide solution is not particularly limited. Examples of the alkali metal hydroxide solution include a solution of sodium hydroxide, potassium hydroxide or the like. An aqueous sodium hydroxide solution is preferred from the standpoint of economy. A first alkali metal hydroxide in the first alkali metal hydroxide solution and a second alkali metal hydroxide in the second alkali metal hydroxide solution are preferably of the same kind. For example, sodium hydroxide is used as each of them. It is also possible to use a combination of different alkali metal hydroxides, for example, sodium hydroxide as the first alkali metal hydroxide and potassium hydroxide as the second alkali metal hydroxide.

The alkali metal hydroxide solution is blended preferably by adding the alkali metal hydroxide solution to the cellulose pulp, for example, directly adding dropwise the alkali metal hydroxide solution or spraying the alkali metal hydroxide solution to the cellulose pulp. The addition by spraying is preferred from the standpoint of good uniformity of the obtained alkali cellulose.

The concentration of the alkali metal hydroxide in the alkali metal hydroxide solution is preferably from 10 to 60% by mass, more preferably from 30 to 50% by mass from the standpoint of an etherification efficiency and handleability. The concentrations of first alkali metal hydroxide and the second alkali metal hydroxide are preferably the same, but they may be different from each other.

The step of mixing a cellulose pulp with a first alkali metal hydroxide solution with stirring is preferably carried out in a reactor having an internal stirring structure. The reactor is preferably equipped with a device capable of measuring the inside temperature of the reactor.

Before mixing a cellulose pulp with a first alkali metal hydroxide solution with stirring, it is preferable to remove oxygen in the reactor by a vacuum pump or the like and add an inert gas, preferably nitrogen for replacement in order to suppress depolymerization caused in the presence of the alkali metal hydroxide and oxygen.

Regarding the amount of the first alkali metal hydroxide solution, a mole ratio of the first alkali metal hydroxide to the cellulose in the cellulose pulp (first alkali metal hydroxide/cellulose) is preferably from 2.0 to 4.0, more preferably from 2.7 to 3.5. When the mole ratio of the first alkali metal hydroxide to the cellulose is less than 2.0, the resulting alkyl cellulose may have excessively lowered gelation temperature and may fail to exhibit viscosity. In addition, an alkyl cellulose having high gel strength may not be produced. When the mole ratio is more than 4.0, an alkyl cellulose having high gel strength may not be produced.

The ratio of the mass of the first alkali metal hydroxide in the first alkali metal hydroxide solution to the total mass of the first alkali metal hydroxide in the first alkali metal hydroxide solution and the second alkali metal hydroxide in the second alkali metal hydroxide solution is preferably from 50 to 86%, more preferably from 65 to 80%, still more preferably from 65 to 75%. When the ratio of the mass of the first alkali metal hydroxide to the total mass of the first and second alkali metal hydroxides is less than 50%, the gelation temperature is inevitably lowered so that the resulting alkyl cellulose cannot exhibit viscosity. In addition, an alkyl cellulose having high gel strength cannot be produced. When the ratio of the mass of the first alkali metal hydroxide to the total mass of the first and second alkali metal hydroxides is more than 86% of, an alkyl cellulose having high gel strength cannot be produced.

The inside temperature of the reactor, when the cellulose pulp and the first alkali metal hydroxide are blended, preferably when the first alkali metal hydroxide solution is added to the cellulose pulp, is preferably from 10 to 80° C., more preferably from 30 to 70° C. from the standpoint of obtaining uniform alkali cellulose.

A blending rate of the first alkali metal hydroxide in the first alkali metal hydroxide solution means a mole amount of the first alkali metal hydroxide added for a unit time per mol of the cellulose pulp, and is preferably from 1.5 to 48 [mol/mol·hr], more preferably from 4.8 to 18.6 [mol/mol·hr], still more preferably from 8 to 15 [mol/mol·hr] from the standpoint of uniform mixing of the first alkali metal hydroxide solution in the system.

After the addition of the first alkali metal hydroxide solution, mixing with stirring may be continued for from 5 to 30 minutes to obtain a more uniform alkali cellulose.

An organic solvent such as dimethyl ether, which does not affect the alkylation, may be added to the system before, during or after addition of the first alkali metal hydroxide solution to suppress local heat generation in the reactor.

Then, the alkali cellulose thus obtained is reacted with an alkylating agent to obtain a first reaction mixture.

Examples of the alkylating agent include a methylating agent such as methyl chloride, dimethyl sulfate and methyl iodide; and an ethylating agent such as ethyl chloride, diethyl sulfate and ethyl iodide. Of these, methyl chloride and ethyl chloride are preferred from the standpoint of solubility of the resulting alkyl cellulose in water and from the standpoint of economy.

When the alkylating agent is reacted, the inside temperature of the reactor is preferably from 40 to 90° C., more preferably from 50 to 80° C. from the standpoint of reaction control.

Regarding the molar amount of the alkylating agent to be blended, a mole ratio of the mole of the alkylating agent to the total moles of the first and second alkali metal hydroxides (alkylating agent/total alkali metal hydroxides) is preferably from 0.8 to 1.5, more preferably from 1.0 to 1.3. When the mole ratio (alkylating agent/alkali metal hydroxides in total) is less than 0.8, the alkyl groups may not be introduced in a required amount. When the mole ratio is more than 1.5, blending of the alkylating agent in an excess amount may be economically disadvantageous.

When the alkylating agent is blended, the alkylating agent is preferably added to the alkali cellulose. The addition time of the alkylating agent is preferably from 30 to 120 minutes, more preferably from 40 to 90 minutes from the standpoint of reaction control and productivity.

The first reaction mixture thus obtained may be optionally purified into an alkyl cellulose by a method similar to a conventional purification method of a crude alkyl cellulose.

The degree of substitution (DS) of the alkyl groups of the alkyl cellulose in the first reaction mixture is preferably from 0.75 to 1.68, more preferably from 0.81 to 1.68, still more preferably from 0.99 to 1.37 from the standpoint of a desirable viscosity or storage modulus. The term DS (degree of substitution) means an average number of hydroxyl groups replaced by alkyl groups per glucose ring unit of the cellulose.

Then, without blending any alkylating agent further, a second alkali metal hydroxide solution is mixed with the alkylated first reaction mixture with stirring to obtain a second reaction mixture.

The timing of blending the second alkali metal hydroxide solution with the first reaction mixture, in other words, the timing of starting to blend the second alkali metal hydroxide solution, is preferably the time when addition of 80% by mass or more of the total amount of the alkylating agent to be blended is completed, more preferably after addition of the alkylating agent is completed. When addition of the second alkali metal hydroxide solution is started before the completion of the addition of 80% by mass of the total amount of the alkylating agent to be blended, the alkyl cellulose thus obtained may not have high gel strength.

Regarding the amount of the second alkali metal hydroxide in the second alkali metal hydroxide solution, a mole ratio of the second alkali metal hydroxide to the cellulose in the cellulose pulp (second alkali metal hydroxide/cellulose) is preferably from 0.65 to 2.0, more preferably from 0.88 to 1.48. When the mole ratio (alkali metal hydroxide/cellulose) is less than 0.65, an alkyl cellulose having high gel strength may not be produced. When the mole ratio is more than 2.0, the alkyl cellulose thus obtained may not exhibit viscosity due to an excessive reduction in the gelation temperature. In addition, the alkyl cellulose may not have high gel strength.

The inside temperature of the reactor when blending of the second alkali metal hydroxide solution with the first reaction mixture is started, preferably when addition of the second alkali metal hydroxide solution to the first reaction mixture is started, is preferably from 65 to 90° C., more preferably from 75 to 85° C. When the inside temperature of the reactor at the time when addition of the second alkali metal hydroxide solution is started is less than 65° C., the alkyl cellulose thus obtained may not have high gel strength. When the inside temperature of the reactor at the time when the addition is started is more than 90° C., heat generation by a mercerization reaction with the alkali metal hydroxide, or an exothermic reaction of alkylation may not be controlled. Further, from the standpoint of obtaining an alkyl cellulose having high gel strength, the inside temperature of the reactor when the blending of the second alkali metal hydroxide solution is completed is preferably from 80° C. to 100° C., more preferably from 85 to 95° C. The temperature when the addition is started is preferably selected to be lower than the temperature when the addition is completed, and a temperature difference therebetween is preferably from 3 to 20° C., more preferably from 4 to 15° C.

The blending rate of the second alkali metal hydroxide in the second alkali metal hydroxide solution means a molar amount of the second alkali metal hydroxide to be blended with the first reaction mixture per hour per mol of the cellulose in the cellulose pulp. It is preferably from 0.5 to 9.6 [mol/mol·hr], more preferably from 1.0 to 6.5 [mol/mol·hr], still more preferably from 1.0 to 3.5 [mol/mol·hr]. When the blending rate of the second alkali metal hydroxide is less than 0.5 [mol/mol·hr], the blending time of the second alkali metal hydroxide is prolonged, which may lead to extension of the reaction time. Further, in this case, an alkyl cellulose having high gel strength may not be produced. When the blending rate of the second alkali metal hydroxide is more than 9.6 [mol/mol·hr], an alkali cellulose having high gel strength may not be produced.

In the step of blending the second alkali metal hydroxide solution with the first reaction mixture, the inside temperature of the reactor is preferably increased at a constant rate from the start to the completion of the blending of the second alkali metal hydroxide solution from the standpoint of obtaining an alkyl cellulose having high gel strength. The temperature increase rate is preferably from 3.0 to 50° C./hr, more preferably from 8.0 to 45° C./hr, still more preferably from 8.0 to 30° C./hr.

An alkali cellulose obtained by mixing cellulose pulp with an alkali metal hydroxide solution is usually converted to an alkyl cellulose through etherification with an alkylating agent. In this case, the alkylating agent in the reaction system is gradually consumed with the progress of the etherification. When the inside temperature of the reactor is constant, the etherification rate gradually decreases as the alkylating agent is consumed in the reaction system. Therefore, the blending of the second alkali metal hydroxide solution while increasing the inside temperature of the reactor at a constant rate, can suppress a reduction in the etherification rate caused by the consumption of the alkylating agent in the reaction system, and the etherification rate by the blending of the second alkali metal hydroxide solution is increased relatively. As a result, an alkyl cellulose having high viscosity and high gel strength can be produced.

After the second alkali metal hydroxide solution is blended, mixing with stirring is preferably continued to complete the etherification.

The inside temperature of the reactor during mixing with stirring after the second alkali metal hydroxide solution is blended, is preferably from 80 to 120° C., more preferably from 85 to 100° C. from the standpoint of reaction control. The heating after blending of the second alkali metal hydroxide solution is blended, is preferable to complete the reaction.

The mixing time with stirring after the second alkali metal hydroxide solution is blended, is preferably from 10 to 60 minutes, more preferably from 20 to 40 minutes from the standpoint of productivity.

The second reaction mixture thus obtained can be purified into an alkyl cellulose in the same manner as a conventional purification method of a crude alkyl cellulose. The purification is carried out by a method comprising the steps of: for example, mixing the second reaction mixture with water of from 60 to 100° C. in a stirring vessel to dissolve a salt generated as a byproduct during the reaction, and subjecting a suspension taken out of the stirring vessel to separation operation for removal of the salt to obtain a desired purified alkyl cellulose. As the separation operation, for example, a rotary pressure filter can be used. The separation operation is followed by drying in a dryer. As the dryer, for example, a conductive heat transfer groove-type agitation dryer may be used.

The alkyl cellulose thus obtained may be optionally pulverized with a conventional pulverizer such as a ball mill, a roller mill or an impact grinder. The alkyl cellulose thus pulverized may be classified by a sieve to control its particle size.

Preferred examples of the alkyl cellulose thus obtained include methyl cellulose and ethyl cellulose.

The degree of substitution (DS) of alkyl groups of the alkyl cellulose is preferably from 1.61 to 2.03, more preferably from 1.74 to 2.03. The alkyl cellulose having DS of less than 1.61 may not have high gel strength. On the other hand, a process for producing an alkyl cellulose having DS of more than 2.03 may be economically disadvantageous because of a large amount of the alkylating agent and the alkali metal hydroxide.

In general, DS represents the degree of substitution and means an average number of hydroxyl groups replaced by a methoxy or ethoxy group per glucose ring unit of the cellulose.

The degree of substitution of the alkyl groups of the alkyl cellulose can be determined by the Zeisel-GC method described in J. G. Gobler, E. P. Samscl and G. H. Beaber, Talanta, 9, 474 (1962).

The viscosity at 20° C. of 1% by mass aqueous solution of alkyl cellulose when measured with a Brookfield type viscometer is from 4,000 to 11,000 mPa·s (from 60,000 to 150,000 mPa·s as the viscosity of 2% by mass aqueous solution measured with a Brookfield type viscometer), preferably from 4,000 to 8,000 mPa·s (from 60,000 to 110,000 mPa·s as the viscosity of 2% by mass aqueous solution measured with a Brookfield type viscometer), more preferably from 4,000 to 7,500 mPa·s (from 60,000 to 100,000 mPa·s as the viscosity of 2% by mass aqueous solution measured with a Brookfield type viscometer). When the viscosity of 1% by mass aqueous solution is less than 4,000 mPa·s, a food containing the alkyl cellulose has low viscosity and a deteriorated food texture. When the viscosity of 1% by mass aqueous solution is more than 11,000 mPa·s, the oil-in-water type composition loses its flowability and becomes a solid composition so that it has a poor texture. In addition, an increase in viscosity is likely to bring difficulty in an operation during production, such as difficulty in a measurement operation or a charging operation into a mixing tank.

The viscosity with a Brookfield type viscometer can be measured in accordance with the analytical method for methyl cellulose specified in the Japanese Pharmacopoeia 16th Edition.

The gel strength of the alkyl cellulose is expressed by a storage modulus G' (65° C.) at 65° C. of a 1.5% by mass aqueous solution of the alkyl cellulose. In general, the storage modulus means an elastic component of a solution, which is a component having properties of restoring a substance deformed by application of a force to its original shape after the force is released. It is an index of gel strength.

The storage modulus G' (65° C.) at 65° C. of a 1.5% by mass aqueous solution of the alkyl cellulose is preferably from 2,500 to 4,500 Pa, more preferably from 2,700 to 4,500 Pa, still more preferably from 3,000 to 4,300 Pa, particularly preferably from 3,000 to 4,000 Pa. When the storage modulus G' (65° C.) is less than 2,500 Pa, a food containing such an alkyl cellulose has low gel strength and cannot have a good texture. When it is more than 4500 Pa, a food containing such an alkyl cellulose has too high gel strength and therefore has a solid texture.

The storage modulus G' (65° C.) of a 1.5% by mass aqueous solution of the alkyl cellulose may be measured, for example, using MCR500 which is a rheometer of Anton Paar.

The 1.5% by mass aqueous solution of the alkyl cellulose is prepared in a method comprising the steps of: accurately weighing a dried product corresponding to 4.50 g of the alkyl cellulose in a wide-mouthed bottle (i.e. a container having a 350-ml volume, a diameter of 65 mm and a height of 120 mm); adding hot water of 98° C. thereto obtain a total amount of 300.0 g; capping the container; then stirring the resulting mixture with a stirrer at from 350 to 450 rpm for 20 minutes to obtain a uniform dispersion; and stirring the dispersion for 40 minutes in a water bath of 5° C. or less for dissolution to obtain a sample solution.

A sample measurement section of the rheometer is controlled to 65° C. in advance and the 1.5% by mass aqueous solution of the alkyl cellulose thus obtained is poured up to a marked line (25 ml) of a CC27 measurement cup (a cylindrical vessel made of aluminum and having a diameter of 30 mm and a height of 80 mm). Measurement is started by setting an angular frequency of 1 rad/s and applying a distortion with an amplitude of 10% by using a bob cylinder (having a diameter of 26.7 mm and a height of 40.0 mm: CC27). The sample measurement section is kept constant at 65° C. The data are collected at a point every minute. The maximum value of the storage modulus for 60 minutes from the start of the measurement is regarded as the storage modulus G' (65° C.) in the invention.

The gelation temperature of the alkyl cellulose is evaluated using the relationship between the storage modulus G' (30 to 80° C.) and a loss modulus G". In general, the loss modulus means a viscous component of a solution, which is a component having the properties in which resistance is generated due to deformation of a fluid caused by the fluid movement. It is an index of the gelation temperature.

The gelation temperature of a 1.5% by mass aqueous solution of the alkyl cellulose is preferably from 40 to 55° C., more preferably from 44 to 53° C., still more preferably from 48 to 53° C. When the gelation temperature is less than 40° C., the dissolution temperature of the alkyl cellulose in water becomes so low that the alkyl cellulose may not be dissolved therein and sufficient viscosity may not be obtained. When the gelation temperature is more than 55° C., a food containing the alkyl cellulose may have low gelation strength so that a good texture may not be obtained.

The gelation temperature of a 1.5% by mass aqueous solution of the alkyl cellulose may be measured using, for example, MCR500 which is a rheometer of Anton Paar.

The 1.5% by mass aqueous solution of the alkyl cellulose is prepared in the same manner as the method for preparing a sample solution for the measurement of the storage modulus G' (65° C.).

A sample measurement section of the rheometer is adjusted at 30° C. in advance, the 1.5% by mass aqueous solution of the alkyl cellulose is poured up to a marked line (25 ml) of a CC27 measurement cup (a cylindrical container having a diameter of 30 mm and a height of 80 mm), and a distortion with an amplitude of 0.5% is applied at the frequency at 1 Hz to start the measurement. The temperature of the sample measurement section is increased by 2° C./minute to 80° C. Data are collected at two points every minute.

The storage modulus G' (30 to 80° C.) and the loss modulus G", which are obtained by the above measurement, are variable with an increase in the temperature of the measurement system. The temperature at which the loss modulus G" becomes equal to the storage modulus G' (30 to 80° C.), in other words, the temperature at which the ratio of G" to G' (30 to 80° C.) becomes 1, is regarded as a gelation temperature.

(2) Oil-in-Water Type Composition and Food

An oil-in-water composition is blended with an ingredient of a heat-cooking type processed food such as Hamburg steak, meatball, meatloaf, meat putty, chicken nugget, meat croquette, mince cutlet, filling for steamed meat dumplings, filling for fried meat dumplings, filling for meat buns, chicken meatball, ham, and sausage for the purpose of improvement of a juicy feel and a texture. Further, the oil-in-water composition itself may become a food as a substitute for the above food. The oil-in-water type composition has a good texture and a good chewy texture even in an non-cooked state so that it may become a food by itself.

The oil-in-water type composition comprises an alkyl cellulose, a 1% by mass aqueous solution of which has a viscosity at 20° C. of from 4,000 to 11,000 mPa·s when measured with a Brookfield type viscometer and a 1.5% by mass aqueous solution of which has a storage modulus G' (65° C.) at 65° C. of from 2,500 to 4,500 Pa; an edible oil or fat; and water.

Examples of the edible oil or fat include an edible vegetable oil or fat such as palm oil, palm kernel oil, coconut oil, corn oil, cottonseed oil, soybean oil, rapeseed oil, rice oil, sunflower oil, safflower oil and cacao butter; an edible animal oil or fat such as beef tallow, milk fat, lard, sal butter, fish oil and whale oil; a processed oil or fat obtained by subjecting the edible vegetable oil or fat or the edible animal oil or fat to one or more treatments selected from hydrogenation, fractionation and ester exchange; and a dairy product containing an oil or fat, or a food analogous to a dairy product containing an oil or fat.

The content of the edible oil or fat in the oil-in-water type composition is preferably from 5 to 50% by mass, more preferably from 10 to 30% by mass from the standpoint of stability of the composition of water and the edible oil or fat without separation therebetween.

The alkyl cellulose has some of the hydroxyl groups of the cellulose replaced by methoxy groups and/or others, and is a water-soluble polysaccharide having, in the molecule thereof, methoxy groups and/or others which are lipophilic and hydroxyl groups which are hydrophilic. As described above, such an alkyl cellulose that a 1% by mass aqueous solution of the alkyl cellulose has a viscosity at 20° C. of from 4,000 to 11,000 mPa·s when measured with a Brookfield type viscometer, and a 1.5% by mass aqueous solution of the alkyl cellulose has a storage modulus G' (65° C.) at 65° C. of from 2,500 to 4,500 Pa, is used. The chewy texture can be obtained by making use of such properties of the alkyl cellulose.

The alkyl cellulose is comprised by the oil-in-water type composition preferably in an amount of from 1 to 20% by mass, more preferably from 2 to 10% by mass, from the standpoint of chewy texture both in a non-cooked state and in a cooked (i.e. heated) state.

Water (including ice water) is comprised by the oil-in-water type composition preferably in an amount of from 40 to 90% by mass, more preferably from 50 to 70% by mass from the standpoint of a sufficient texture and juicy feel of the composition. The temperature of the water to be added is preferably from −5 to 10° C., more preferably from 0 to 5° C. from the standpoint of the solubility of the alkyl cellulose.

Examples of the water include ion exchanged water, distilled water, tap water, buffer, and ice made thereof.

The oil-in-water type composition may further comprise an additive such as a saccharide, a sweetener, an organic acid, a thickener or a seasoning. The content of each additive varies depending on the intended use of the oil-in-water type composition. It is preferably from 1 to 30% by mass from the standpoint of a chewy texture irrespective of whether the oil-in-water type composition is cooked (i.e. heated) or not cooked, or from the standpoint of suppression of separation of the edible oil or fat or separation of water from the composition.

The saccharide is not particularly limited. Examples of the saccharide include glucose, fructose, sucrose, maltose, enzyme-saccharified syrup, lactose, hydrogenated starch hydrolysate, high-fructose corn syrup, sucrose bound syrup, oligosaccharide, reducing sugar, polydextrose, sorbitol, hydrogenated lactose, trehalose, xylose, xylitol, maltitol, erythritol, mannitol, fructooligosaccharide, soybean oligosaccharide, galactooligosaccharide, lactosucrose, raffinose, lactulose, and palatinose oligosaccharide. The saccharide may be used singly or in combination of two or more.

Examples of the sweetener include sucralose, acesulfame potassium, stevia, and aspartame. The sweetener may be used singly or in combination of two or more.

Examples of the organic acid include citric acid, lactic acid, gluconic acid, malic acid, tartaric acid, fumaric acid, acetic acid, glacial acetic acid, phytic acid, adipic acid, succinic acid, glucono-delta-lactone, ascorbic acid, and various fruit juice such as citrus fruit juice. The organic acid may be used singly or in combination of two or more.

Examples of the thickener include alginic acid, LM pectin, HM pectin, gellan gum, xanthan gum, guar gum, carrageenan, locust bean gum, guar gum, gum tragacanth, gum arabic, tamarind gum, cellulose, microfibrillated cellulose, fermented cellulose, crystalline cellulose, carboxymethyl cellulose, konjac mannan, glucomannan, agar, gelatin, soybean protein, and dietary fiber. The thickener may be used singly or in combination of two or more.

Examples of the seasoning include glycine, sodium glutamate, amino acid-based seasoning, salt, and an organic acid such as acetic acid. The seasoning may be used singly or in combination of two or more.

Next, a method for producing an oil-in-water type composition will be described. The oil-in-water type composition may be produced by a method comprising the steps of: mixing the edible oil or fat with the alkyl cellulose with stirring, and then mixing the resulting mixture with water. The reason why the water is blended with the mixture of the edible oil or fat and the alkyl cellulose is that the resulting composition can have a sufficient texture and juicy feel.

Examples of the mixer include a hand mixer, a homogenizer, a colloid mill, a static mixer, an inline mixer, and a disper mill. The mixing conditions are variable depending on the type of mixer selected. When a hand mixer for home use is selected, a uniform oil-in-water type composition can be obtained preferably by stirring at 500 to 1500 rpm for 20 seconds. It is all right to subject the oil-in-water type composition thus obtained to heat sterilization treatment or cooling treatment for plasticization. It is also possible to subject the oil-in-water type composition to mixing treatment after the heat sterilization treatment and then to optional cooling treatment. Examples of the heat sterilization method include UHT (ultra-high temperature), HTST (high temperature short time), LTLT (low temperature long time), a direct heating method such as injection system and infusion system, and an indirect heating method such as scraping system. The heat sterilization method may be carried out preferably at from 70 to 180° C. As the cooling method, the composition is poured in an appropriate container and allowed to stand for cooling or to be cooled in a refrigerator; or the composition may be cooled in a rapidly cooling plasticizer such as perfector or combinator and then poured in an appropriate container.

The hardness, chewiness and adhesiveness of a composition including the oil-in-water type composition thus obtained can be analyzed using a texture analyzer. The hardness analyzed with the texture analyzer becomes an index of the hardness of a food. The chewiness is defined as an energy necessary for chewing a semi-solid food into a swallowable state and determined by the following calculation equation:

Chewiness=hardness×cohesiveness×elasticity.

The higher the hardness and the chewiness are, the better the chewy texture becomes.

As the texture analyzer, for example, a texture analyzer TA-XT plus manufactured by ECO INSTRUMENTS or a compact table tester EZ-TEST manufactured by Shimadzu Corporation may be used.

From the standpoint of a food having a chewy texture in a non-cooked (i.e. non-heated) state, the hardness is preferably from 2.6 to 4.0N, more preferably from 3.0 to 3.6N, and the chewiness is preferably from 1.8 to 2.5N, more preferably from 2.0 to 2.5N. The adhesiveness is preferably from 1.0 to 1.5N, more preferably from 1.1 to 1.3N from the standpoint of keeping stable shape retention properties of the oil-in-water type composition.

From the standpoint of a food having a sufficient chewy texture in a cooked (i.e. heated) state, the hardness is preferably from 50 to 65N, more preferably from 55 to 60N, and the chewiness is preferably from 35 to 45N, more preferably from 38 to 45N.

The amount of the edible oil or fat and water separated during chewing of the oil-in-water type composition can be determined by compressing the cooked (i.e. heated) oil-in-water type composition by a texture analyzer. The amount of the edible oil or fat and water separated from the compressed cooked composition is preferably from 1.0 to 3.5 g, more preferably from 1.0 to 2.0 g per oil-in-water type composition containing 200 g of water from the standpoint of a juicy feel during chewing.

When the oil-in-water type composition is cooked, heating causes separation of the edible oil or fat and water. The amount of the separation is variable depending on the gel strength or water retention properties of the gelled alkyl cellulose. The amount of the edible oil or fat and water separated from the cooked (i.e. heated) food is preferably from 0.5 to 4.0 g, more preferably from 1.0 to 3.5 g from the standpoint of reduction of a mass decrease.

A food comprising the oil-in-water type composition in a non-cooked (i.e. non-heated) state is not particularly limited. It can be obtained by adding an additive to the oil-in-water type composition or mixing the oil-in-water type composition with meat or fish meat. The content of the oil-in-water type composition in the non-cooked (i.e. non-heated) food is preferably from 1 to 30% by mass. The non-cooked meat or fish meat may cause food poisoning due to bacteria so that it is preferably subjected to heat sterilization or cooking before mixed with the oil-in-water type composition. Although the oil-in-water type composition at room temperature has hardness different from that of a gel obtained by cooking, it has a good chewy texture and shape retention properties. The good chewy texture and shape retention properties are attributable to the alkyl cellulose capable of stably retaining the edible oil or fat and water and having a thickening effect. The oil-in-water type composition in a non-cooked state does not undergo a change in shape because the separation of water and the edible oil or fat is not observed even after a lapse of time.

On the other hand, a food comprising the oil-in-water type composition to be cooked (i.e. heated) is not particularly limited. The food is obtained by adding an additive or the like to the oil-in-water type composition as described above, and cooking in almost any heating manner such as baking, frying or steaming in an microwave oven, a gas range, an oven or a dryer. The cooking is performed so that the center temperature of a cooking object becomes preferably from 55 to 90° C., more preferably from 65 to 80° C. Heating at a heat gelation temperature or more for a sufficient time is necessary to obtain a chewy texture of the oil-in-water type composition. The heating temperature and heating time are preferably controlled, depending on the thickness of the cooking object. For example, when cooking is performed in a temperature controller such as dryer, the heating temperature is preferably from 80 to 100° C. and the heating time is preferably from 10 to 60 minutes, respectively, from the standpoint of gelation properties.

The content of the oil-in-water type composition in the food to be cooked is preferably from 1 to 80% by mass.

EXAMPLES

The invention will be described in detail with reference to Synthesis Examples and Comparative Synthesis Examples of an alkyl cellulose, as well as Examples and Comparative Examples. It should not be construed that the invention is limited to or by Synthesis Examples and Examples.

Synthesis Example 1

A wood pulp having an intrinsic viscosity of 1,350 ml/g was pulverized with a pulverizer to obtain a cellulose pulp powder. The cellulose pulp powder in an amount corresponding to 6.0 kg of cellulose was placed in an internal-stirring pressure-resistant reactor with a jacket. Nitrogen substitution after vacuum evacuation is carried out to thoroughly remove oxygen in the reactor.

Next, a 49% by mass aqueous sodium hydroxide solution as a first alkali metal hydroxide solution in such an amount to make a mole ratio of a first sodium hydroxide to the cellulose (first sodium hydroxide/cellulose) to be 2.62 was added to the reactor with stirring at an addition rate of 10.48 [mol/mol·hr], while adjusting the inside temperature of the reactor at 60° C., to obtain alkali cellulose.

Subsequently, 2.4 kg of dimethyl ether was added thereto, while adjusting the inside temperature of the reactor at 60° C. After the addition of dimethyl ether, while increasing the inside temperature of the reactor from 60° C. to 80° C., methyl chloride in such an amount to make a mole ratio of the methyl chloride to the total amount of the first and second sodium hydroxides (methyl chloride/total sodium hydroxides) to be 1.1 was added thereto over 60 minutes to obtain a first reaction mixture. Subsequently to the addition of methyl chloride, a 49% by mass aqueous sodium hydroxide solution as a second alkali metal hydroxide solution in such an amount to make a mole ratio of a second sodium hydroxide to the cellulose (second sodium hydroxide/cellulose) to be 1.60 was added thereto at an addition rate of 3.20 [mol/mol·hr] to obtain a second reaction mixture. The inside temperature of the reactor was 77° C. at the start of the addition of the second sodium hydroxide solution and 89° C. at the completion of the addition thereof. The inside temperature of the reactor was increased at 24° C./hr from the start to the completion of the addition of the second aqueous sodium hydroxide solution. After the completion of the addition of the second aqueous sodium hydroxide solution, the stirring was continued for 30 minutes to complete the etherification. The ratio of the mass of the first sodium hydroxide in the first aqueous sodium hydroxide solution to the total mass of the first and second sodium hydroxides in the first and second aqueous sodium hydroxide solutions was 62.1%.

The obtained second reaction mixture was made into a slurry by addition of hot water of 95° C., then washed with a rotary pressure filter, and dried with an air drier. The dried product was pulverized with a ball mill and classified through a sieve to obtain methyl cellulose. The experimental conditions are shown in Table 1.

The obtained methyl cellulose had a DS of 1.81, and the viscosity at 20° C. of a 1% by mass aqueous solution of the methyl cellulose determined with a Brookfield type viscometer was 4,300 mPa·s (viscosity at 20° C. of a 2% by mass aqueous solution thereof determined with a Brookfield type viscometer: 59,000 mPa·s). The storage modulus G' (65° C.) at 65° C. of a 1.5% by mass aqueous solution of the methyl cellulose was determined to be 3,000 Pa, and the gelation temperature was 48° C. The obtained results are shown in Table 1.

Synthesis Example 2

Methyl cellulose was obtained in the same manner as in Synthesis Example 1 except that a cellulose pulp powder obtained by pulverizing a wood pulp having an intrinsic viscosity of 1,600 ml/g with a pulverizer was used.

The obtained methyl cellulose had a DS of 1.82, and the viscosity at 20° C. of a 1% by mass aqueous solution of the methyl cellulose determined with a Brookfield type viscometer was 7,200 mPa·s (viscosity at 20° C. of a 2% by mass aqueous solution thereof determined with a Brookfield type viscometer: 99,000 mPa·s). The storage modulus G' (65° C.) at 65° C. of a 1.5% by mass aqueous solution of the methyl cellulose was determined to be 3,500 Pa, and the gelation temperature was 46° C.

Synthesis Example 3

Methyl cellulose was obtained in the same manner as in Synthesis Example 1 except that a cellulose pulp powder obtained by pulverizing a wood pulp having an intrinsic viscosity of 2,000 ml/g with a pulverizer was used.

The obtained methyl cellulose had a DS of 1.83, and the viscosity at 20° C. of a 1% by mass aqueous solution of the methyl cellulose determined with a Brookfield type viscometer was 11,000 mPa·s (viscosity at 20° C. of a 2% by mass aqueous solution thereof determined with a Brookfield type viscometer: 150,000 mPa·s). The storage modulus G' (65° C.) at 65° C. of a 1.5% by mass aqueous solution of the methyl cellulose was determined to be 4,500 Pa, and the gelation temperature was 50° C.

Synthesis Example 4

A cellulose pulp powder obtained by pulverizing a wood pulp having an intrinsic viscosity of 1,400 ml/g with a pulverizer was placed in the same manner as in Synthesis Example 1. A 49% by mass aqueous sodium hydroxide solution as a first alkali metal hydroxide solution in such an amount to make a mole ratio of a first sodium hydroxide to the cellulose (first sodium hydroxide/cellulose) to be 2.26 was added to the reactor with stirring at an addition rate of 9.04 [mol/mol·hr], while adjusting the inside temperature of the reactor at 55° C., to obtain alkali cellulose.

Subsequently, a first reaction mixture was obtained in the same manner as in Synthesis Example 1. Then a second reaction mixture was obtained in the same manner as in Synthesis Example 1 except that the inside temperatures of the reactor at the start of the addition of the second sodium hydroxide solution and at the completion of the addition thereof were 80° C. and 92° C., respectively, and the inside temperature of the reactor was increased at 36° C./hr from the start of the addition of the second aqueous sodium hydroxide solution to the completion thereof; and the second aqueous sodium hydroxide solution in such an amount to make a mole ratio of a second sodium hydroxide to the cellulose (second sodium hydroxide/cellulose) to be 1.84 was added at an addition rate of 5.52 [mol/mol·hr]. The ratio of the mass of the first sodium hydroxide in the first aqueous sodium hydroxide solution to the total mass of the first and second sodium hydroxides in the first and second aqueous sodium hydroxide solutions was 55.1%.

The obtained second reaction mixture was purified and pulverized in the same manner as in Synthesis Example 1 to obtain methyl cellulose. The experimental conditions are shown in Table 1.

The obtained methyl cellulose had a DS of 1.85, and the viscosity at 20° C. of a 1% by mass aqueous solution of the methyl cellulose determined with a Brookfield type viscometer was 5,820 mPa·s (viscosity at 20° C. of a 2% by mass aqueous solution thereof determined with a Brookfield type viscometer: 79,000 mPa·s). A storage modulus G' (65° C.) at 65° C. of a 1.5% by mass aqueous solution of the methyl cellulose was determined to be 2,750 Pa, and the gelation temperature was 43° C. The obtained results are shown in Table 1.

Synthesis Example 5

After addition of dimethyl ether to the alkali cellulose, methyl chloride in such an amount to make a mole ratio of the methyl chloride to a total amount of the first and second sodium hydroxides (methyl chloride/sodium hydroxides in total) to be 1.1 was added to the resulting mixture over 60 minutes, while increasing the inside temperature of the reactor from 60° C. to 85° C., to obtain the first reaction mixture. Then methyl cellulose was obtained in the same manner as in Synthesis Example 1 except that the inside temperatures of the reactor at the start of the addition of the second sodium hydroxide solution and at the completion of the addition thereof were 85° C. and 89.5° C., respectively, and the inside temperature of the reactor was increased at 9.0° C./hr from the start of the addition of the second aqueous sodium hydroxide solution to the completion thereof. Experimental conditions are shown in Table 1.

The obtained methyl cellulose had a DS of 1.83, and the viscosity at 20° C. of a 1% by mass aqueous solution of the methyl cellulose determined with a Brookfield type viscometer was 6,250 mPa·s (viscosity at 20° C. of a 2% by mass aqueous solution thereof determined with a Brookfield type viscometer: 84,750 mPa·s). A storage modulus G' (65° C.) at 65° C. of a 1.5% by mass aqueous solution of the methyl cellulose was determined to be 3,700 Pa, and the gelation temperature was 43° C.

Synthesis Example 6

A cellulose pulp powder was placed in a reactor in the same manner as in Synthesis Example 4. A 49% by mass aqueous sodium hydroxide solution as a first alkali metal hydroxide solution in such an amount to make a mole ratio of a first sodium hydroxide to the cellulose (first sodium hydroxide/cellulose) to be 3.01 was added to the reactor with stirring at an addition rate of 12.04 [mol/mol·hr], while adjusting the inside temperature of the reactor at 55° C.

Subsequently, a first reaction mixture was obtained in the same manner as in Synthesis Example 1. Then a second reaction mixture was obtained in the same manner as in Synthesis Example 1 except that the inside temperatures of the reactor at the start of the addition of the second aqueous sodium hydroxide solution and at the completion of the addition thereof were at 81° C. and 89° C., respectively, and the inside temperature of the reactor was increased at 16.4° C./hr from the start of the addition of the second aqueous sodium hydroxide solution to the completion of the addition thereof; and the second aqueous sodium hydroxide solution in such an amount to make a mole ratio of a second sodium hydroxide to the cellulose (second sodium hydroxide/cellulose) to be 1.26 was added at an addition rate of 2.58 [mol/mol·hr]. The ratio of the mass of the first sodium hydroxide in the first sodium hydroxide solution to the total mass of the first and second sodium hydroxides in the first and second aqueous sodium hydroxide solutions was 70.5%.

The obtained second reaction mixture was then purified and pulverized in the same manner as in Synthesis Example 1 to obtain methyl cellulose. The experimental conditions are shown in Table 1.

The obtained methyl cellulose had a DS of 1.85, and the viscosity at 20° C. of a 1% by mass aqueous solution of the methyl cellulose determined with a Brookfield type viscometer was 6,000 mPa·s (viscosity at 20° C. of a 2% by mass aqueous solution thereof determined with a Brookfield type viscometer: 82,000 mPa·s). A storage modulus G' (65° C.) at 65° C. of a 1.5% by mass aqueous solution of the methyl cellulose was determined to be 3,300 Pa, and the gelation temperature was 53° C. The obtained results are shown in Table 1.

Synthesis Example 7

A cellulose pulp powder was placed in a reactor in the same manner as in Synthesis Example 4. A 49% by mass aqueous sodium hydroxide solution as a first alkali metal hydroxide solution in such an amount to make a mole ratio of a first sodium hydroxide to the cellulose (first sodium hydroxide/cellulose) to be 2.85 was added to the reactor with stirring at an addition rate of 11.39 [mol/mol·hr], while adjusting the inside temperature of the reactor at 55° C., to obtain alkali cellulose.

Subsequently, a first reaction mixture was obtained in the same manner as in Synthesis Example 1. Then a second reaction mixture was obtained in the same manner as in Synthesis Example 1 except that the inside temperatures of the reactor at the start of the addition of the second sodium hydroxide solution and at the completion of the addition thereof were 79° C. and 91° C., respectively, and the inside temperature of the reactor was increased at 24° C./hr from the start of the addition of the second aqueous sodium hydroxide solution to the completion of the addition thereof; and the second aqueous sodium hydroxide solution in such an amount to make a mole ratio of a second sodium hydroxide to the cellulose (second sodium hydroxide/cellulose) to be 1.40 was added at an addition rate of 2.80 [mol/mol·hr]. The ratio of the mass of the first aqueous sodium hydroxide solution to the total mass of the first and second sodium hydroxides in the first and second aqueous sodium hydroxide solutions was 67.0%.

The obtained second reaction mixture was then purified and pulverized in the same manner as in Synthesis Example 1 to obtain methyl cellulose. The experimental conditions are shown in Table 1.

The obtained methyl cellulose had a DS of 1.82, and the viscosity at 20° C. of a 1% by mass aqueous solution of the methyl cellulose determined with a Brookfield type viscometer was 6,050 mPa·s (viscosity at 20° C. of a 2% by mass aqueous solution thereof determined with a Brookfield type viscometer: 82,500 mPa·s). A storage modulus G' (65° C.) at 65° C. of a 1.5% by mass aqueous solution of the methyl cellulose was determined to be 3,300 Pa, and the gelation temperature was 51° C. The results thus obtained are shown in Table 1.

Comparative Synthesis Example 1

A cellulose pulp powder was placed in a reactor in the same manner as in Synthesis Example 1. A 49% by mass aqueous sodium hydroxide solution as a first alkali metal hydroxide solution in such an amount to make a mole ratio of a first sodium hydroxide to the cellulose (first sodium hydroxide/cellulose) to be 1.87 was added to the reactor with stirring at an addition rate of 7.48 [mol/mol·hr], while adjusting the inside temperature of the reactor at 40° C. After the completion of the addition, the stirring was continued for further 10 minutes.

Subsequently, 2.4 kg of dimethyl ether was added to reactor, while adjusting the inside temperature of the reactor at 40° C. After the addition of dimethyl ether, methyl chloride was divided and added in two stages similarly to the addition of the sodium hydroxide solution. First methyl chloride in such an amount to make a mole ratio of the first methyl chloride to the first sodium hydroxide (first methyl chloride/first sodium hydroxide) to be 1.1 was added over 25 minutes to obtain a first reaction mixture. After the completion of the addition of the first methyl chloride, the inside temperature of the reactor was increased from 40° C. to 80° C. over 40 minutes. After it reached 80° C., the mixing with stirring was continued for further 30 minutes.

Subsequently, a 49% by mass aqueous sodium hydroxide solution as a second alkali metal hydroxide solution in such an amount to make a mole ratio of a second sodium hydroxide to the cellulose (second sodium hydroxide/cellulose) to be 2.42 was added at an addition rate of 14.54 [mol/mol·hr], while keeping the inside temperature of the reactor at 80° C., to obtain a second reaction mixture. The inside temperature of the reactor during the addition of the second aqueous sodium hydroxide solution was 80° C. and the inside temperature of the reactor at the time of the completion of the addition thereof was also 80° C. The ratio of the mass of the first sodium hydroxide in the first aqueous sodium hydroxide solution to the total mass of the first and second sodium hydroxides in the first and second aqueous sodium hydroxide solutions was 43.6%.

Subsequently, the second methyl chloride in such an amount to make the mole ratio of the second methyl chloride to the second sodium hydroxide (second methyl chloride/second sodium hydroxide) to be 1.1 was added over 30 minutes, while keeping the inside temperature of the reactor at 80° C. After the addition of the second methyl chloride, the mixing with stirring was carried out for 30 minutes, while further keeping the inside temperature of the reactor at 80° C. Then the inside temperature of the reactor was increased from 80° C. to 95° C. over 15 minutes to obtain crude methyl cellulose.

The obtained crude methyl cellulose was then purified and pulverized in the same manner as in Synthesis Example 1 to obtain methyl cellulose.

The obtained methyl cellulose had a DS of 1.82, and the viscosity at 20° C. of a 1% by mass aqueous solution of the methyl cellulose determined with a Brookfield type viscometer was 3,600 mPa·s (viscosity at 20° C. of a 2% by mass aqueous solution thereof determined with a Brookfield type viscometer: 50,000 mPa·s). A storage modulus G' (65° C.) at 65° C. of a 1.5% by mass aqueous solution of the methyl cellulose was determined to be 3,500 Pa, and the gelation temperature was 46° C.

Comparative Synthesis Example 2

An cellulose pulp powder was placed in a reactor in the same manner as in Synthesis Example 1. A 49% by mass aqueous sodium hydroxide solution as the first alkali metal hydroxide solution in such an amount to make a mole ratio of a first sodium hydroxide to the cellulose (first sodium hydroxide/cellulose) to be 4.11 was added to the reactor with stirring at an addition rate of 16.44 [mol/mol·hr], while adjusting the inside temperature of the reactor at 60° C., to obtain alkali cellulose.

Subsequently, a first reaction mixture was prepared in the same manner as in Synthesis Example 4. A second reaction mixture was obtained in the same manner as in Synthesis Example 1 except that the inside temperatures of the reactor at the start of the addition of the second aqueous sodium hydroxide solution and at the completion of the addition thereof were 80° C. and 91° C., respectively, and the inside temperature of the reactor was increased at a rate of 22° C./hr from the start of the addition of the second aqueous sodium hydroxide solution to the completion of the addition thereof; and the second aqueous sodium hydroxide solution in such an amount to make a mole ratio of a second sodium hydroxide to the cellulose (second sodium hydroxide/cellulose) to be 0.46 was added at an addition rate of 0.92 [mol/mol·hr]. The ratio of the mass of the first sodium hydroxide in the first aqueous sodium hydroxide solution to the total mass of the first and second sodium hydroxides in the first and second aqueous sodium hydroxide solutions was 89.9%.

The obtained second reaction mixture was then purified and pulverized in the same manner as in Synthesis Example 1 to obtain methyl cellulose. The experimental conditions are shown in Table 1.

The obtained methyl cellulose had a DS of 1.82, and the viscosity at 20° C. of a 1% by mass aqueous solution of the methyl cellulose determined with a Brookfield type viscometer was 5,750 mPa·s (viscosity at 20° C. of a 2% by mass aqueous solution thereof determined with a Brookfield type viscometer: 78,000 mPa·s). A storage modulus G' (65° C.) at 65° C. of a 1.5% by mass aqueous solution of the methyl cellulose was determined to be 1,950 Pa, and the gelation temperature was 62° C. The obtained results are shown in Table 1.

TABLE 1

| | production conditions | | | | | | | | properties | | |
|---|---|---|---|---|---|---|---|---|---|---|---|
| | | first NaOH | | | second NaOH | | | | | viscosity of 2 wt % aq. solution with Brookfield type viscometer (mPa·s) | storage modulus G' (65° C.) of 1.5 wt % aqueous solution (Pa) | gellation temperature of 1.5 wt % aqueous solution (° C.) |
| | addtion of methyl chloride | mass ratio (%) to total of first and second NaOH | Mole Ratio To Cellulose | addition rate to cellulose (mol/mol·hr) | mole ratio to cellulose | addtion rate to cellulose (mol/mol·hr) | Inside temp. of Reactor at start of addition (° C.) | temp. increase rate (° C./hr) | degree of substitution of methoxy (DS) | | | |
| Syn. Ex. 1 | once | 62.1 | 2.62 | 10.48 | 1.60 | 3.20 | 77 | 24 | 1.81 | 4,300 | 3,000 | 48 |
| Syn. Ex. 2 | once | 62.1 | 2.62 | 10.48 | 1.60 | 3.20 | 77 | 24 | 1.82 | 7,200 | 3,500 | 46 |
| Syn. Ex. 3 | once | 62.1 | 2.62 | 10.48 | 1.60 | 3.20 | 77 | 24 | 1.83 | 11,000 | 4,500 | 50 |
| Syn. Ex. 4 | once | 55.1 | 2.26 | 9.04 | 1.84 | 5.52 | 80 | 36 | 1.85 | 5,820 | 2,750 | 43 |
| Syn. Ex. 5 | once | 62.1 | 2.62 | 10.48 | 1.60 | 3.20 | 85 | 9 | 1.83 | 6,250 | 3,700 | 43 |
| Syn. Ex. 6 | once | 70.5 | 3.01 | 12.04 | 1.26 | 2.58 | 81 | 16.4 | 1.85 | 6,000 | 3,300 | 53 |
| Syn. Ex. 7 | once | 67.0 | 2.85 | 11.39 | 1.40 | 2.80 | 79 | 24 | 1.82 | 6,050 | 3,300 | 51 |
| Comp. Syn. Ex. 1 | twice | 43.6 | 1.87 | 7.48 | 2.42 | 14.54 | 80 | — | 1.82 | 3,600 | 3,500 | 46 |
| Comp. Syn. Ex. 2 | once | 89.9 | 4.11 | 16.44 | 0.46 | 0.92 | 80 | 22 | 1.82 | 5,750 | 1,950 | 62 |

Example 1

The 80 g of an edible oil or fat (product of Nisshin Oillio) and 10 g of the methyl cellulose produced in Synthesis Example 1 were placed in the bowl of a hand mixer (DL-2392, product of Kai Corporation), mixed lightly, and subjected to addition of 200 g of water of 0° C., followed by stirring with the hand mixer at 1000 revolutions per minute for 20 seconds. The bowl of the hand mixer was rotated clockwise twice in the 20 seconds for uniform stirring with the blade of the hand mixer to obtain an oil-in-water type composition.

<Quantitative Evaluation by Texture Analyzer>

The 60 g of the obtained oil-in-water type composition was placed in a cylindrical stainless steel container having a diameter of 45 mm and a depth of 55 mm, and left to stand at room temperature for 3 hours. Then, the hardness, chewiness and adhesiveness of the oil-in-water type composition were measured using a texture analyzer TA-XT plus (product of ECO INSTRUMENTS). As a result of measurement of various physical properties of the oil-in-water type composition at 25° C., hardness of 3.1N, chewiness of 2.0N, and adhesiveness of 1.1N were found. In addition, the amount of water and the edible oil or fat which had oozed out from the oil-in-water type composition placed in the stainless steel container was 0.1 g, and there was no separation of the edible oil or fat and water even after three days.

The 60 g of the oil-in-water type composition placed in the stainless steel container was heated at 80° C. for 40 minutes by using an air dryer. The amount of the edible oil or fat and water (i.e. separated amount of the oil in this case) separated from the heated oil-in-water type composition was equivalent of the amount of the oil which had oozed out of the surface when the stainless container containing 60 g of the oil-in-water type composition was tilted, and it was 2.8 g. As a result of measurement of various physical properties of the heated oil-in-water type composition, hardness of 55N and chewiness of 38N were found. The amount of the edible oil or fat and water (i.e. separated amount of the oil in this case) separated from the heated oil-in-water type composition after compressed using the texture analyzer TA-XT plus was equivalent of the amount of the oil which had oozed out when the stainless container containing 60 g of the oil-in-water type composition was tilted, and it was 1.8 g.

The measurement conditions of the texture analyzer are as follows:

Measuring equipment: texture analyzer TA-XT plus (product of ECO Instruments)

Measurement instrument: a cylinder probe having a diameter of 25 mm (Model No. P/25P)

Measurement mode: TPA

Test speed: 5.0 mm/sec

Target mode: distance

Probe penetration depth: 20 mm (measured at 25° C.) 10 mm (measured at 80° C.)

Time: 5.0 seconds

Measurement strength: 5 g

Example 2

An oil-in-water type composition was produced in the same manner as in Example 1 except that the methyl cellulose produced in Synthesis Example 2 was used. Various physical properties of the oil-in-water type composition of 25° C. (i.e. not being cooked) and the oil-in-water type composition heated at 80° C. for 40 minutes (i.e. being cooked) were measured by using the texture analyzer in the same manner as in Example 1. The results are shown in Table 2.

Example 3

An oil-in-water type composition was produced in the same manner as in Example 1 except that the methyl cellulose produced in Synthesis Example 3 was used. Various physical properties of the oil-in-water type composition of 25° C. (i.e. not being cooked) and the oil-in-water type composition heated at 80° C. for 40 minutes (i.e. being cooked) were measured by using the texture analyzer in the same manner as in Example 1. The results are shown in Table 2.

Example 4

An oil-in-water type composition was produced in the same manner as in Example 1 except that the methyl cellulose produced in Synthesis Example 4 was used. Various physical properties of the oil-in-water type composition of 25° C. (i.e. not being cooked) and the oil-in-water type composition heated at 80° C. for 40 minutes (i.e. being cooked) were measured by using the texture analyzer in the same manner as in Example 1. The results are shown in Table 2.

Example 5

An oil-in-water type composition was produced in the same manner as in Example 1 except that the methyl cellulose produced in Synthesis Example 5 was used. Various physical properties of the oil-in-water type composition of 25° C. (i.e. not being cooked) and the oil-in-water type composition heated at 80° C. for 40 minutes (i.e. being cooked) were measured by using the texture analyzer in the same manner as in Example 1. The results are shown in Table 2.

Example 6

An oil-in-water type composition was produced in the same manner as in Example 1 except that the methyl cellulose produced in Synthesis Example 6 was used. Various physical properties of the oil-in-water type composition of 25° C. (i.e. not being cooked) and the oil-in-water type composition heated at 80° C. for 40 minutes (i.e. being cooked) were measured by using the texture analyzer in the same manner as in Example 1. The results are shown in Table 2.

Example 7

An oil-in-water type composition was produced in the same manner as in Example 1 except that the methyl cellulose produced in Synthesis Example 7 was used. Various physical properties of the oil-in-water type composition of 25° C. (i.e. not being cooked) and the oil-in-water type composition heated at 80° C. for 40 minutes (i.e. being cooked) were measured by using the texture analyzer in the same manner as in Example 1. The results are shown in Table 2.

Comparative Example 1

An oil-in-water type composition was produced in the same manner as in Example 1 except that methyl cellulose produced in Comparative Synthesis Example 1 was used. Various physical properties of the oil-in-water type composition of 25° C. (i.e. not being cooked) and the oil-in-water type composition heated at 80° C. for 40 minutes (i.e. being cooked) were measured by using the texture analyzer in the same manner as in Example 1. The results are shown in Table 2.

Regarding the various physical properties of the oil-in-water type composition produced in Comparative Example 1, the viscosity of a 1% by mass solution of the alkyl cellulose was lower than 4,000 mPa·s and out of the preferable range so that the oil-in-water type composition did not exhibit an adequate viscosity and had inferior shape retention properties to those in Example 1. The shape retention properties could also be evaluated by adhesiveness determined with the texture analyzer and it was lower than 1.0N and out of the preferable range.

Comparative Example 2

An oil-in-water type composition was produced in the same manner as in Example 1 except that the methyl cellulose produced in Comparative Synthesis Example 2 was used. Various physical properties of the oil-in-water type composition of 25° C. and the oil-in-water type composition heated at 80° C. for 40 minutes were measured by using the texture analyzer in the same manner as in Example 1. The results are shown in Table 2.

Regarding the various physical properties of the oil-in-water type composition produced in Comparative Example 2, a storage modulus G' (65° C.) of a 1.5% by mass aqueous solution of the alkyl cellulose was less than 2,500 Pa so that the oil-in-water type composition did not have adequate hardness and chewiness compared with those of Example 1.

The oil-in-water type compositions obtained in Example 1 to 7 and Comparative Examples 1 and 2 were not only subjected to the evaluation by the above-described texture analyzer, but also subjected to sensory evaluation by evaluators. More specifically, the compositions in a cooked state and in a non-cooked state were evaluated for shape retention properties and chewy texture by 10 evaluators as below. The results are shown in Table 2.

Regarding the shape retention properties of the oil-in-water type composition before heated, 60 g of the oil-in-water type composition was formed into a round shape by hands. The change in the round shape after it was left to stand for 3 days at 25° C. was observed and evaluated by 10 evaluators.

Regarding the chewing texture of the oil-in-water type composition before heated, 60 g of each oil-in-water type compositions produced in Examples 1 to 7 and Comparative Examples 1 and 2 was formed into a round shape by hands, and then was eaten and evaluated by evaluators. Regarding the shape retention of the heated oil-in-water type composition, 60 g of the oil-in-water type composition was formed into a round shape by hands, heated at 80° C. for 40 minutes, and evaluated based on the appearance observation. Further, regarding the chewy texture and juicy feel of the heated oil-in-water type composition, 60 g of the oil-in-water type composition was formed into a round shape by hands, heated at 80° C. for 40 minutes, and eaten and evaluated by evaluators.

Each evaluation was performed in the following three grades: A, B and F based on the following evaluation criteria.

A: Eight or more evaluators evaluated a product as good.
B: Five or more but less than eight evaluators evaluated a product good.
F: Less than five evaluators evaluated a product as good.

When the values determined by the texture analyzer and sensory evaluation by 10 evaluators are compared, the oil-in-water type compositions having higher hardness and higher chewiness values as measured with the texture analyzer are evaluated by the evaluators as better chewy texture. Thus, the chewy texture can be evaluated quantitatively by the texture analyzer. The oil-in-water type compositions having adhesiveness of 1.1N or more as measured with the texture analyzer have higher shape retention properties and the evaluators also evaluate them to have good shape retention properties without shape collapse. After 60 g of an oil-in-water type composition is placed in a stainless steel container and compressed by the texture analyzer, when the separated amount of the liquid becomes 1.0 to 3.5 g, such a composition is also evaluated to provide a juicy feel according to the sensory evaluation by the evaluators.

Thus, the results of the sensory evaluation by 10 evaluators can be quantitatively determined by the hardness, chewiness, adhesiveness and separated amount of the liquid after compression, which are obtained with the texture analyzer.

TABLE 2

| | properties of methyl cellulose | | | | chewy texture | | | shape retention properties | | |
|---|---|---|---|---|---|---|---|---|---|---|
| | | | | | | | | | not cooked | |
| | viscosity (mPa·s) | storage modulus (Pa) | Gelation Temperature (° C.) | degree of substitution (DS) | hardness *1 (N) | chewiness *1 (N) | chewy texture *2 | adhesiveness *1 (N) | shape retention properties *2 | separated amount of oil (g) |
| Syn. Ex. 1 | 4,300 | 3,000 | 48 | 1.79 | 3.1 | 2.0 | A | 1.1 | A | 0.1 |
| Syn. Ex. 2 | 7,200 | 3,500 | 46 | 1.82 | 3.3 | 2.1 | A | 1.2 | A | 0.1 |
| Syn. Ex. 3 | 11,000 | 4,500 | 50 | 1.83 | 3.5 | 2.2 | A | 1.3 | A | 0.1 |
| Syn. Ex. 4 | 5,820 | 2,750 | 43 | 1.85 | 2.8 | 2.0 | A | 1.0 | A | 0.1 |
| Syn. Ex. 5 | 6,250 | 3,700 | 43 | 1.83 | 3.3 | 2.1 | A | 1.1 | A | 0.1 |
| Syn. Ex. 6 | 6,000 | 3,300 | 53 | 1.85 | 3.2 | 2.1 | A | 1.1 | A | 0.1 |

TABLE 2-continued

| | viscosity | storage modulus | Gelation Temperature | degree of substitution | | | | | | | |
|---|---|---|---|---|---|---|---|---|---|---|---|
| Syn. Ex. 7 | 6,050 | 3,300 | 51 | 1.82 | 3.2 | 2.1 | A | | 1.1 | A | 0.1 |
| Comp. Syn. Ex. 1 | 3,600 | 3,500 | 46 | 1.82 | 3.0 | 1.9 | B | | 0.9 | B | 0.2 |
| Comp. Syn. Ex. 2 | 5,750 | 1,950 | 62 | 1.84 | 2.3 | 1.6 | F | | 0.8 | F | 0.5 |

| | properties of methyl cellulose | | | | chewy texture | | | shape | cooked (i.e. heated) | | |
|---|---|---|---|---|---|---|---|---|---|---|---|
| | | | | | | | | | | juicy feeling | |
| | | | | | | | | | separated amount of oil after | | separated |
| | viscosity (mPa·s) | storage modulus (Pa) | Gelation Temperature (° C.) | degree of substitution (DS) | hardness *1 (N) | chewiness *1 (N) | chewy texture *2 | retention properties *2 | compressed *1 (g) | juicy feeling *2 | amount of oil (g) |
| Syn. Ex. 1 | 4,300 | 3,000 | 48 | 1.79 | 55 | 38 | A | A | 1.8 | A | 2.8 |
| Syn. Ex. 2 | 7,200 | 3,500 | 46 | 1.82 | 56 | 39 | A | A | 1.6 | A | 3.0 |
| Syn. Ex. 3 | 11,000 | 4,500 | 50 | 1.83 | 60 | 40 | A | A | 1.3 | A | 3.2 |
| Syn. Ex. 4 | 5,820 | 2,750 | 43 | 1.85 | 53 | 38 | A | A | 1.0 | A | 3.4 |
| Syn. Ex. 5 | 6,250 | 3,700 | 43 | 1.83 | 56 | 38 | A | A | 1.5 | A | 2.9 |
| Syn. Ex. 6 | 6,000 | 3,300 | 53 | 1.85 | 55 | 39 | A | A | 1.7 | A | 3.1 |
| Syn. Ex. 7 | 6,050 | 3,300 | 51 | 1.82 | 55 | 39 | A | A | 1.6 | A | 3.0 |
| Comp. Syn. Ex. 1 | 3,600 | 3,500 | 46 | 1.82 | 56 | 37 | B | B | 0.65 | B | 4.1 |
| Comp. Syn. Ex. 2 | 5,750 | 1,950 | 62 | 1.84 | 39 | 30 | F | F | 0.32 | F | 6.1 |

*1 Quantitative evaluation with a texture analyzer was carried out.
*2 Sensory evaluation by ten evaluators was carried out.

Example 4

Food: Pseudo Hamburg Steak Prepared without Cooking

The oil-in-water type composition produced in Example 1 was subjected to addition of salt and garlic powders, and the 60 g of the resulting mixture was formed into pseudo Hamburg steak. The shape of the oil-in-water type composition thus formed did not collapse easily, and the pseudo Hamburg steak had chewy texture and a texture.

Example 5

Food: Sausage Prepared by Cooking

The oil-in-water type composition produced in Example 1 was subjected to addition of salt and garlic powders, packed into a food sausage casing, and heated at such a temperature that the center of the oil-in-water type composition became 80 to 100° C. The resulting sausage made of the oil-in-water type composition had a juicy feel and a good texture.

The invention claimed is:

1. An oil-in-water composition, comprising:
    an alkyl cellulose, a 1% by mass aqueous solution of which has a viscosity at 20° C. of from 4,000 to 11,000 mPa·s when measured with a Brookfield viscometer, and a 1.5% by mass aqueous solution of which has a storage modulus G'(65° C.) at 65° C. of from 2,500 to 4,500 Pa;
    an edible oil or fat; and
    water,
    wherein the alkyl cellulose is methyl cellulose.
2. The oil-in-water composition according to claim 1, wherein a 1.5% by mass aqueous solution of the alkyl cellulose has a gelation temperature of from 40 to 55° C.
3. The oil-in-water composition according to claim 1, wherein the methyl cellulose has a degree of substitution (DS) of alkyl groups of from 1.61 to 2.03.
4. A food comprising the oil-in-water composition as claimed in claim 1 in a non-cooked state.
5. A food comprising the oil-in-water composition as claimed in claim 1 in a cooked state.

* * * * *